United States Patent [19]

Mulder et al.

[11] 3,912,944

[45] Oct. 14, 1975

[54] INTEGRATED BUCKET BRIGADE MEMORY USING TRANSISTOR BARRIER CAPACITORS FOR STORAGE

[75] Inventors: Cornelis Mulder; Frederik L. J. Sangster, both of Eindhoven, Netherlands

[73] Assignee: U.S. Philips Corporation, New York, N.Y.

[22] Filed: Apr. 22, 1974

[21] Appl. No.: 462,974

Related U.S. Application Data

[63] Continuation of Ser. No. 380,764, July 19, 1973, abandoned.

[30] Foreign Application Priority Data

Apr. 23, 1968 Netherlands ........................ 6805704

[52] U.S. Cl. ............ 307/238; 307/221 D; 307/303; 357/24; 357/40

[51] Int. Cl.$^2$ ..................... G11C 11/34; G11C 19/00; H01L 29/78

[58] Field of Search ............ 307/221 R, 221 D, 238, 307/246, 293, 303

[56] References Cited

UNITED STATES PATENTS

| | | | |
|---|---|---|---|
| 3,356,860 | 12/1967 | Norman | 307/221 R |
| 3,474,260 | 10/1969 | Frohbach | 307/221 R |
| 3,546,490 | 12/1970 | Sangster | 307/293 |

*Primary Examiner*—Stanley D. Miller, Jr.
*Attorney, Agent, or Firm*—Frank R. Trifari; Simon L. Cohen

[57] ABSTRACT

An integrated capacitor memory where a group of series connected transistors having their bases connected to a source of sequential switching pulses transfer charge stored on the base to collector internal capacitance of each transistor to the next succeeding transistor.

19 Claims, 15 Drawing Figures

INVENTORS
CORNELIS MULDER
FREDERIK L. J. SANGSTER
BY Frank R. Trifari
AGENT

INVENTORS
CORNELIS MULDER
FREDERIK L. J. SANGSTER
BY [signature]
AGENT

INVENTORS
CORNELIS MULDER
FREDERIK L.J. SANGSTER
BY [signature]
AGENT

INVENTORS
CORNELIS MULDER
FREDERIK L. J. SANGSTER
BY
Frank R. Trifari
AGENT

INVENTORS
CORNELIS MULDER
FREDERIK L.J. SANGSTER
BY
AGENT

INVENTORS
CORNELIS MULDER
FREDERIK L. J. SANGSTER
BY
AGENT

INTEGRATED BUCKET BRIGADE MEMORY USING TRANSISTOR BARRIER CAPACITORS FOR STORAGE

This is a continuation, of application Ser. No. 380,764, filed July 19, 1973, now abandoned.

The invention relates to an integrated capacitor memory comprising a series of capacitances in which charge can be transferred from one capacitance of the series to the following capacitance of the series through a transistor by means of control signals, for which purpose such a transistor is present between every two successive capacitances of the series, said transistors also constituting a series, the collector of such a transistor being connected to the emitter of the succeeding transistor for transferring charge, the integrated memory comprising a substrate which is provided with insulated semiconductor islands in which the transistors of the series are provided.

The invention furthermore relates to a circuit arrangement employing such an integrated capacitor memory.

Capacitor memories are frequently used inter alia as memories for analogous information, for example, in delay lines for audio frequency or video frequency signals, or in filter circuits. In connection with the integration it is of importance that no inductances are required for said memories, this in contrast with many other memories and shift registers in which inductances are unavoidable.

In a known circuit arrangement for a capacitor memory of this type which is described in "Electronic Letters", December, 1967, 3, nr. 12, pp. 544–546, the collector and the emitter of succeeding transistors are interconnected through the series arrangement of a diode and a resistor. In this circuit the pass direction of the said diode is chosen to be equal to that of the emitter-base diodes of the transistors. The capacitors are connected to the points of intersection in the circuit between the said diodes and the said resistor. The connection ends of the capacitors having an even number in the series remote from the said points of intersection are interconnected and connected to ground through a switching voltage source. The connection ends of the capacitors having an odd number remote from the said points of intersection are interconnected and connected to ground through a second switching voltage source. In addition the bases of the transistors are connected to ground. The transfer of charge from one capacitor to the next is controlled with the two switching voltage sources, the voltages supplied by said sources being in opposite phases. The transistors which serve as electronic switches are then alternately in the conductive and in the non-conductive condition.

A drawback of this circuit is that a part of the information is retained in the stray collector-base capacitance of the transistors, because the diode prevents the charging of said stray capacitance across the emitter of the next transistor. Particularly at higher frequencies, this produces a proportionately large attenuation.

In order to reduce said attenuation, a circuit has already been proposed in the above mentioned publication which also comprises a series of transistors but in which the collector of one transistor is connected to the base of the succeeding transistor. The memory capacitances in this circuit are included in the collector circuits of the transistors, the connection ends of the capacitances remote from the collector being connected to a switching voltage source. The emitter of each transistor is connected to ground through a resistor, the collector of each transistor being also connected to ground through a diode. The pass direction of said diode and the pass direction of the collector-base junction of the relative transistor are chosen to be opposite to each other.

A drawback of this circuit is that, in comparison with the known circuit described first, in this alternative circuit variations in proportions and doping concentrations of the individual transistors and diodes have a larger influence on the transmission function of the memory. Due to this influence on the transmission function, which influence in the case of alternative circuit is larger by approximately a factor 100, the efficiency upon integration is reduced. Furthermore the series of transistors consist alternately of npn-and pnp-transistors, while upon integration a circuit is to be preferred in which only npn or only pnp-transistors occur.

It is an object of the invention to provide an integrated capacitor memory in which the above-mentioned drawbacks are avoided and it is based inter alia on the recognition of the fact that for that purpose a circuit arrangement may advantageously be used as is described in U.S. Pat. No. 3,546,490 which circuit, due to the small number of circuit elements, is particularly suitable for integration. In this circuit, the principle of which is shown in FIG. 1, the connection end of each capacitor remote from the collector is connected to the base of the relative transistor. In this circuit diodes in the collector-emitter paths are superfluous so that the above drawback of the first described known circuit is avoided. Furthermore the series of transistors comprises no complementary transistors as in the second described known circuit, while small differences between the transistors mutually have a comparatively small influence on the transmission function of the memory.

The invention is furthermore based on the recognition of the fact that the circuit shown in FIG. 1 is not only particularly suitable for integration but that the operation of this circuit upon integration can be improved.

Generally the use of the circuit shown in FIG. 1 will also be restricted by the stray emitter-collector capacitance of the transistor. Due to the presence of said stray capacitance, electric cross-talk between adjacent memory capacitances may occur and the information which is stored in a memory capacitance thus is not fully separated from the information in the further memory capacitances.

In the conventional transistors in which the semiconductor body is arranged within an envelope the stray emitter-collector capacitance consists for a considerable part of the capacitance between the connection conductors of the emitter and the collector. In integrated circuits, however, only short connection conductors, usually constituted by conductive tracks, are required for the connection of the transistors.

The resulting reduction of the emitter-collector capacitance in the present circuit results in a reduction of the electric cross-talk.

Due to the reduction of the electric cross-talk the memory capacitances in an integrated capacitor memory may be chosen to be smaller so that the switching speed increases and the memory can be used at higher frequencies.

The invention is furthermore based on the important recognition of the fact that the chosen circuit can be integrated in a particularly compact and simple form by omitting the capacitors and using the collector-base capacitance of the transistors as a memory capacitance.

According to the invention an integrated capacitor memory of the type described in the preamble is characterized in that the capacitances are constituted by the collector-base capacitances of the transistors, the bases of the transistors being associated with the electric input(s) for the control signals.

In this manner a very simple integrated capacitor memory is obtained which combines a very good operation with a small required surface area per memory element because each memory element is formed by only one transistor. The losses occurring upon transmission of information are substantially entirely determined by the gain factor of the transistors. According as said collector-emitter current gain factor lies closer to the value 1, longer chains of memory elements may be used without any disturbing attenuation occurring.

The integrated capacitor memory according to the invention may be used inter alia for delaying transit times of, for example, audio frequency or video frequency signals. In this case a large delay time per memory element, so per transistor, is desirable because the attenuation of the retarded signal considerably depends upon the total number of transistors of the delay line. When a series of n-transistors is used (see FIG. 1) a maximum delay time per memory element may be obtained when all the bases are connected separately to ground or another reference potential through a switching voltage source. By choosing the switching signals (see FIG. 2) to be so that during $1/n$ part of each scan period T they have a value of E volts and during the rest of that period they have a value of O volt and when in addition they are shifted relative to each other in time by $1/n$ part of the period T in such manner that first the $n^{th}$ Transistor and then the $(n\text{-}1)^{th}$, $(n\text{-}2)^{th}$ and so on, becomes conductive, the delay time per memory element becomes maximum and equal to $$\frac{n-1}{n}$$

T seconds.

In practice, however, the number of required switching sources will preferably be restricted at the expense of some reduction of the delay time per memory unit. This may be obtained by interconnecting a number of bases of transistors and a preferred embodiment of an integrated capacitor memory according to the invention is characterized in that a number of bases of transistors of the series are interconnected, said number containing no two successive transistors.

It will be obvious that a compromise which is as favourable as possible is desired between the number of switching sources to be used on the one hand and the number of required transistors on the other hand. In this connection it is of importance that the delay time per memory element furthermore depends upon the way in which the connections of the bases of various transistors of the series are chosen.

Although for the operation of the shift register it is sufficient that the interconnection of bases of various transistors satisfies the condition that two succeeding transistors cannot simultaneously be conductive, larger memories according to the invention to obtain a favourable compromise are built up of a series of transistors which contains at least two succeeding adjacent groups of the same number of succeeding transistors, the bases of said transistors which are associated with various groups but have the same number in their group being interconnected.

This construction enables the realization of the largest possible delay time per memory element, with a previously determined number of switching sources to be used. The number of transistors per group is determined by the number of switching sources to be used.

The transistors of the series may each be provided in a separate semiconductor island, the transistors being interconnected in normal manner through a pattern of conducting tracks which extends over an insulating layer. However, the semiconductor series of a number of transistors the bases of which are interconnected may advantageously extend in a common semiconductor island, the semiconductor island constituting a common base region, the emitter and collector regions being provided in the form of surface regions. As a result of this the required pattern of conducting tracks becomes simpler while in addition the required semiconductor surface area per memory element is considerably reduced. Generally the current gain factor of the said type of transistors will be somewhat smaller, which, however, is no objection for various applications.

The series of transistors of a capacitor memory according to the invention may contain an output group which contains a device, for example, a transistor or a diode, which erases at least once per scan period T the information, if any, which contains the last memory capacitance of the memory. In addition to this terminating device, the output group may contain a number of transistors of the series which number of transistors is smaller than the number of transistors of the preceding group(s). For this output group also it holds that in connection with the delay time per memory element, the element(s) of the output group including the said terminating device is (are) preferably switched simultaneously with those memory elements of the other group(s) which in their group have the same number.

As was already noted the frequencies at which the memory can be used are also dependent upon the value of the memory capacitances. Generally, according as the frequencies used are lower, the memory capacitances will have to be larger. As a result of this the collector-base capacitance of conventional integrated transistors may be too small, for example, when low frequencies are used.

Therefore, an important embodiment of a capacitor memory having a number of transistors in a common semiconductor island comprises one or more transistors having an increased collector-base capacitance, said embodiment being characterized in that a part of the surface of the collector region of at least one of the transistors of the series is occupied by a further surface region which is of the same conductivity type as and is connected to the base region.

By using the further surface region, the collector-base capacitance of the transistor is considerably increased so that an integrated memory having a series of similar transistors shows a good signal-to-noise ratio also at low frequencies.

Another important embodiment of a capacitor memory having one or more transistors with an increased collector-base capacitance is characterized in that the base region of at least one transistor of the series is a surface region, a first surface part of which is occupied by the emitter region and a second surface part of which is occupied by a second region, the second region which is of the same conductivity type as the emitter region being connected to the collector region adjoining said base region. The second surface part occupies preferably at least ⅓ part of the surface of the base region, while in addition preferably all the transistors of the series are constructed in the same manner.

In these transistors with increased base-collector capacitance, the surface of the base-collector junction is effectively increased and moreover the doping of the second region in doublediffused transistors may be higher than that of the collector so that the capacitance per surface unit of the junction between the second region and the base region is larger than that of the remaining part of the base-collector junction.

The base region of a transistor with increased collector-base capacitance preferably comprise a connection conductor which contacts the base region at a place between the emitter region and the second region.

In this manner a compact structure can be obtained in which the base contact adjoins the emitter region and the second region as much as possible and in which the series resistance in the base region is restricted as much as possible both for the active part of said transistor and for the capacitive part.

In a further embodiment of a capacitor memory having at least one transistor with increased collector-base capacitance, the base region of said transistor according to the invention has a thick, and a thin part, the second region occupying at least a surface part of the thick part of the base region.

In this manner the series resistance of the more capacitive part of the base region, namely the part below the second region, is further reduced.

In addition, for example, in the case of double-diffused transistors, and especially also when the base region comprises a thick part and a thin part, the collector-series resistance may be so large that it plays an important part.

In a further embodiment of a capacitor memory according to the invention, a collector region of a transistor with increased collector-base capacitance contains, in addition to a high ohmic part, a low ohmic part which extends at least partly below the thick part of the base region.

As a result of this the collector series resistance, particularly also in that part of the collector region which lies below the thick part of the base region and which therefore will be thinner than the remaining part of the collector region, is reduced. In a preferred embodiment the transistor is constructed so that the low-ohmic part of the collector region adjoins the thick part of the base region so that not only some capacitance gain can be obtained because due to the higher doping the capacitance per surface unit in the region where the low-ohmic part of the collector region and the thick part of the base region adjoin each other will be larger than outside said region, but also the manufacture of a transistor having a base region with a thick part and a thin part can be simplified as will be described in detail below.

It is to be noted that the base-collector capacitance can also be increased by choosing a higher doping for the collector region. However, in practice this will be difficult to carry out particularly with double-diffused transistors. What can be used indeed are transistors having a base region of a uniform thickness which extends up to the low ohmic part of the collector region. Such a structure can be made, for example, by means of a substrate which is provided with an epitaxial layer which is built up from a low ohmic part and a high ohmic part or which may be doped homogeneously, a buried layer being used in the latter case. The thickness of the epitaxial layer and/or the thickness of the buried layer may be chosen to be so small and so large, respectively, that a diffused base region of the conventional thickness extends up to the low ohmic part of the collector region. Such a solution is difficult to perform, however, in those cases in which the circuit comprises in addition other transistors with other properties, for example, a high collector-base breakdown voltage.

Transistors having an increased collector-base capacitance may also be used advantageously as components, for example, in a capacitor memory in a non-integrated form or as a Miller integrator.

A circuit arrangement comprising an integrated capacitor memory according to the invention is characterized in that input signals may be applied to the emitter of one or more transistors of the series, an output circuit being provided for deriving electric signals from the collector of at least one transistor of the series, control signals being applied to the bases of the transistors of the series by means of at least one switching voltage source, said control signals bringing transistors of the series in the conductive condition for transferring charge, the adjacent transistors of each conductive transistor of the series being non-conductive.

In order that the invention may be readily carried into effect a few embodiments thereof will now be described in greater detail, by way of example, with reference to the accompanying drawings, in which FIG. 1 is the principle circuit diagram of the circuit arrangement which is used in a capacitor memory according to the invention;

FIG. 2 shows switching signals of the switching sources of FIG. 1 as a function of time;

FIG. 3 diagrammatically shows a plan view of an embodiment of an integrated capacitor memory according to the invention;

FIG. 4 diagrammatically shows a plan view which corresponds to the part of FIG. 3 enclosed by a dot-and-dash line, and FIG. 5 diagrammatically shows a cross-sectional view taken on the line V-V of the island 4 in FIG. 4, and in which FIG. 6 is a circuit diagram for the integrated capacitor memory shown in FIGS. 3, 4 and 5;

Figure 1:
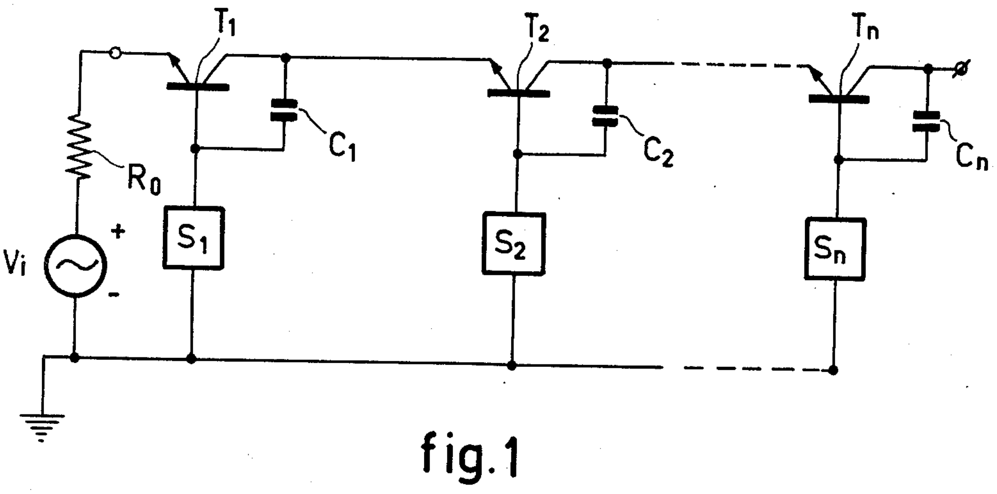
Figure 2:
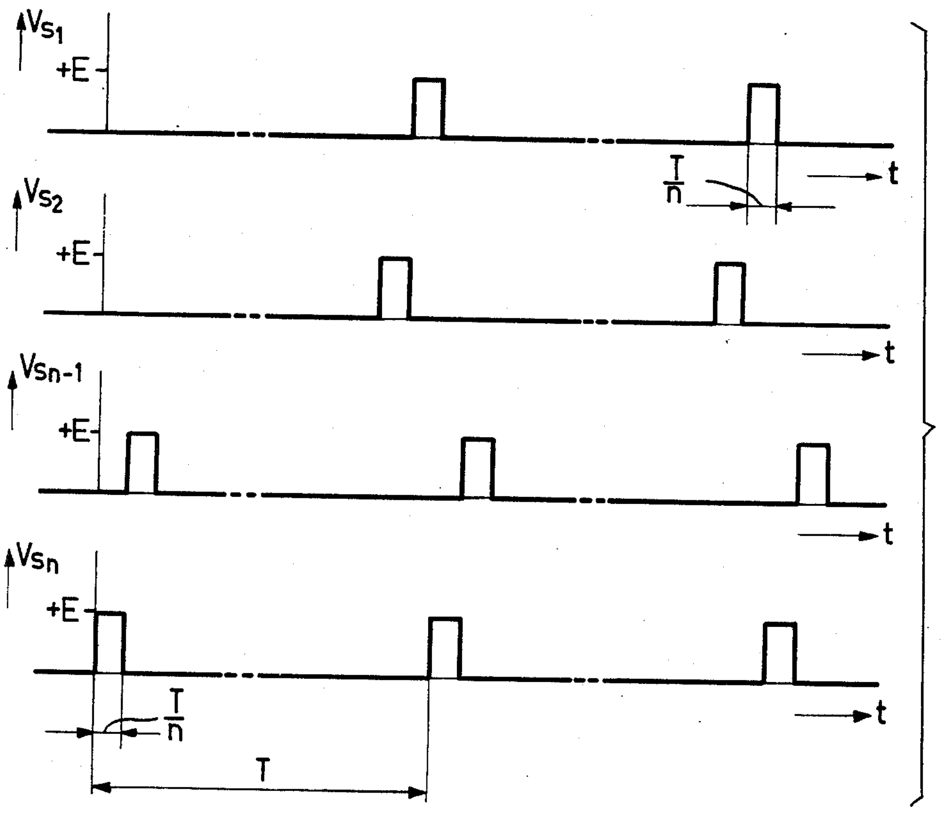
Figure 3:
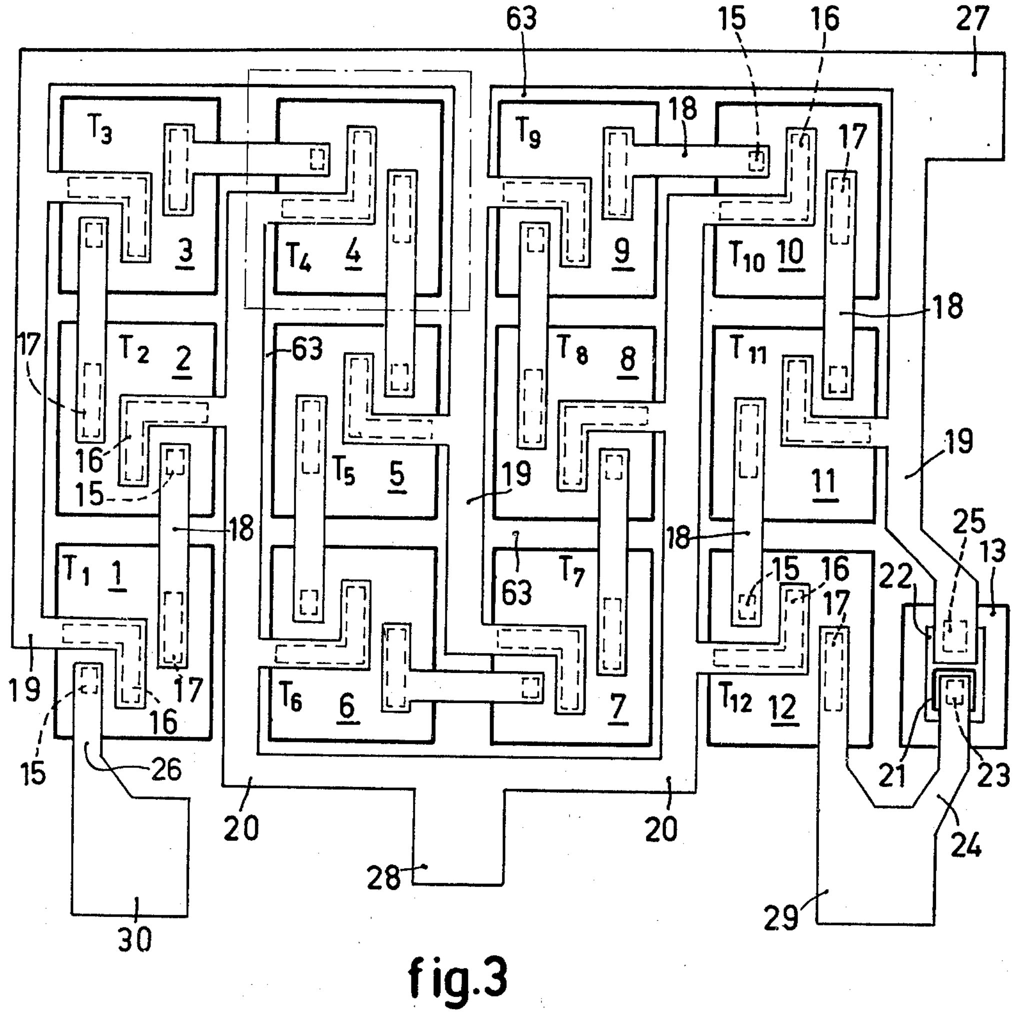
Figure 4:
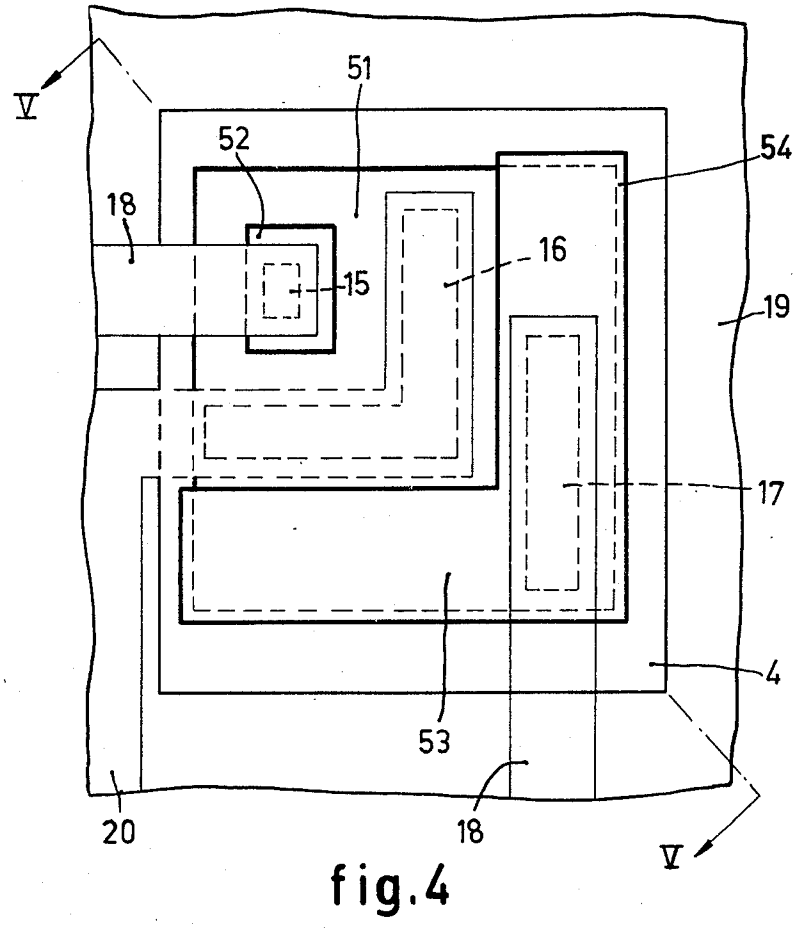
Figure 5:
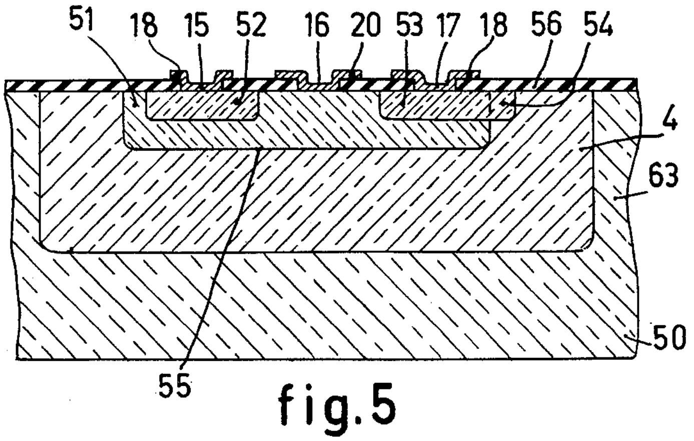

The integrated capacitor memory shown in FIGS. 3, 4 and 5 comprises a series of capacitances in which, by means of control signals, information can be transferred from one capacitance of the series through a transistor $T_n$ ($n$ in FIG. 3 being numbered from 1 to 12) to the next capacitance of the series, for which purpose such a transistor $T_n$ is present between every two succeeding capacitances, said transistors $T_n$ likewise constituting a series, the collector $n$ of such a transistor $T_n$ at the area of a contact window 17 contacting a metal track 18 which connects said collector $n$ for shifting charge at the area of a contact window 15 to the emitter 52 of the subsequent transistor, the integrated memory comprising a substrate 50 which is provided with insulated semiconductor islands 1–13 in which the transistors $T_n$ are located. In the present example, the substrate 50 is of semiconductor material of one conductivity type, while on said material an epitaxial layer of the opposite conductivity type is provided. This epitaxial layer is subdivided into islands 1–13, by insulation regions 63 of one conductivity type. In addition, the surface of the epitaxial layer comprises an insulating layer 56 in which inter alia contact windows 15 – 17 are provided. Each of the islands 1 – 12 comprises one transistor $T_n$, said transistors being shown diagrammatically only in FIG. 3 for clearness' sake by contact windows 15, 16 and 17 for the emitter, the base and the collector of each transistor, respectively.

According to the invention, the memory capacitances are constituted by the collector-base capacitances of the transistors $T_n$, while the bases of the transistors $T_n$ contact one of the metal tracks 19 and 20 through a window 16, and therewith are associated with the electric input(s) for the control signals which are supplied through the metal tracks 19 and 20.

This capacitor memory has a compact simple structure in which the required surface area per memory element is small because every memory element is constituted by one transistor only. The losses due to electric cross-talk through capacitive coupling are substantially negligible and the attenuation is substantially entirely determined by the extent to which the current gain factor of the transistors differs from the value 1.

The bases of a number of transistors $T_n$ are interconnected through windows 16 and the metal tracks 19 or 20, in such manner that such a number of interconnected transistors comprises no two succeeding transistors. As a result of this the same control signal can be supplied simultaneously to the bases of various transistors so that fewer switching voltage sources are required than when a separate control signal is applied to each individual transistor. As already stated above, however, this simplification entails a decrease of the delay time per memory element.

In the present example the bases of the transistors $T_n$ having an odd number are interconnected through the conductive track 19 and the bases of the transistor $T_n$ having an even number are inter-connected through the conductive track 20. As a result of this the series of transistors $T_n$ shows 6 successive adjacent groups having the same number of two successive transistors, the bases of said transistors which are associated with different groups but in their group having the same number being interconnected.

With this manner of connecting, a favourable compromise is reached between the number of switching sources to be used on the one hand and the delay time per memory element on the other hand. When using groups consisting of two transistors, the delay time per memory element is ½T seconds, T being the scan period. With a larger number of transistors per group, the delay time per memory element is directly proportional to the number of transistors per group, which simultaneously comprises information.

The capacitor memory shown in FIGS. 3, 4 and 5, further comprises an output group, in this case constituted by a diode, which is accommodated in the island 13. This diode comprises regions 21 and 22 of conductivity types which are opposite to each other, the region 22 surrounding the region 21 in the semiconductor island. At the area of the contact window 23 the region 21 is connected to the metal track 24, which metal track 24 contacts the collector of the transistor $T_{12}$ at the area of a window 17. Through the contact window 25, the region 22 and the island 13 are connected to the metal track 19, the pn-junction between the region 22 and the island 13 being short-circuited at the area of the window 25.

The integrated memory may be constructed with conventional planar transistors. The collector-base capacitance of such transistors is approximately 1 pF. The value of this capacitance may be increased by increasing the surface area of the base region.

In the example shown in FIGS. 3, 4 and 5, a more effective manner of increasing the base-collector capacitance is used. The collector region of the transistor $T_n$ is constituted by the island $n$ (see FIG. 5 where $n = 4$). The base region is a surface region 51. A first surface part of said region is occupied by the emitter region 52 and a second surface part is occupied by a second region 53, the second region 53 being of the same conductivity type as the emitter region 52 and being connected to the collector region 4 adjoining the base region 51 in that the edge part 54 of the second region 53 occupies a surface part of the collector region.

The pn-junction 55 extends between the base region 51 on one side and the collector region 4 and the second region 53 on the other side. The surface of this pn-junction 55 and hence the collector-base capacitance is considerably larger than when the second region 53 would be absent. Furthermore the doping of the second region 53 may be higher than that of the collector region 4, for example, equal to that of the emitter region 52. This is related to the fact that the doping of the collector region must be chosen to be comparatively low, if a base region 51 and an emitter region 52 are to be provided in the island 4 by means of the conventional photoresist and diffusion methods. Due to the difference in doping between the collector region 4 and the second region 53, the capacitance per surface unit of the part of the pn-junction 55 which is located between the second region 53 and the base region 51 is considerably larger than that of the remaining part of said junction 55.

The second region 53 preferably occupies at least ⅓ part of the surface of the base region 51. When doping concentrations and region thicknesses are used which are normal for planar transistors, the collector-base capacitance then is approximately a factor 2 or more larger than in a base region of equal size but without second region.

Furthermore the place of the base contact window 16 is preferably chosen to be so that said window adjoins the emitter region 52 as much as possible and adjoins the second region 53 so that both the base resistance of the active part of the transistor and the series resistance of the more capacitive part of the base region 51 are restricted as much as possible. The connection conductor 20 therefore contacts the base region 51 at a place given by the contact window 16, which place is located between the emitter region 52 and the second region 53.

The capacitor memory shown in FIGS. 3, 4 and 5 may be manufactured entirely in the manner commonly used in semiconductor technology. The substrate 50 is, for example, *p*-type silicon. On this substrate an epitaxial layer of n-type silicon may be provided, thickness, for example, 10 $\mu$m. The p-type insulation regions 63 may then be provided by means of the conventional photoresist and diffusion methods, so that the insulated islands 1 to 13 are formed. The islands 1 to 12 in which the transistors $T_1 - T_{12}$ are accommodated, have dimensions of for example 125 $\mu m \times$ 135 $\mu$m. The dimensions of the diffused base region 51 may be 85 $\mu m \times 95$ $\mu$m. The thickness of the emitter region 52 is, for example 1 $\mu$m and occupies a surface part of 20 $\mu m \times 30$ $\mu$m of the base region 51. The thickness of the second region 53 also is 1 $\mu$m when it is obtained simultaneously with the emitter regions. The width of the region 53 is, for example, 35 $\mu$m, while the edge part 54 extends, for example, up to 5 $\mu$m beyond the original boundary of the base region 51. The regions 21 and 22 of the diode in the island 13 may be provided simultaneously with the base region 51 and the emitter region 52, respectively.

The surface of the semiconductor body is covered with an insulating layer 56, for example, of silicon oxide and/or silicon nitride. On this insulating layer metal tracks 18, 19, 20 24 and 26 may be provided in the conventional manner and contact the underlying semiconductor regions through windows 15, 16, 17 23 and 25 provided in the layer 56. The metal tracks 19, 20, 24 and 26 furthermore comprise regions 27, 28, 29 and 30 for contacting purposes. These regions 27 to 30 may be connected in normal manner to contact pins of a conventional envelope. The region 30 is associated with the electric input of the memory through which information may be applied to the collector-base capacitance of transistor $T_1$. Output signals may be derived from the collector of the transistor $T_{12}$ through the region 29. The transfer of the charge in the memory may be controlled by means of control signals through the regions 27 and 28.

Figure 6:
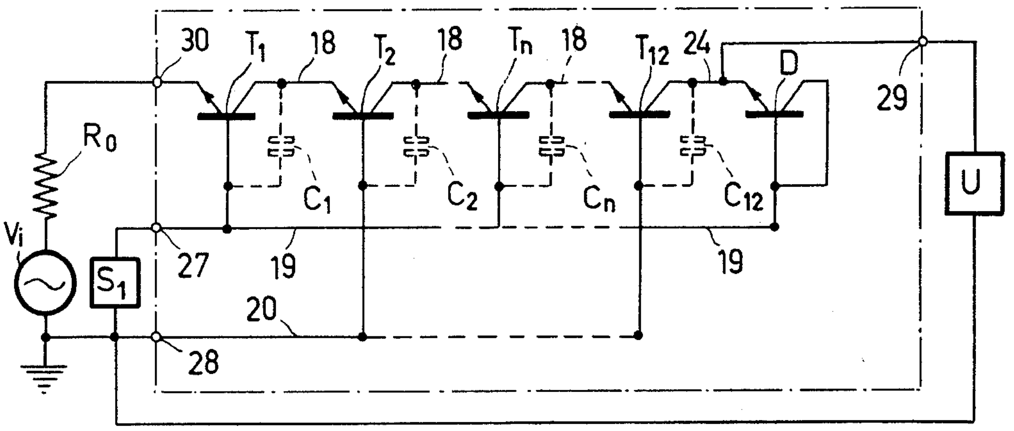

FIG. 6 shows a circuit diagram in which the part within the dot-and-dash line corresponds to the integrated memory as shown in FIGS. 3 to 5.

The electric input of the integrated memory is connected to an input circuit which is constituted by the series arrangement of the resistor $R_o$ and a source which supplies an output signal $V_i$, the terminal of said source remote from the resistor $R_o$ being connected to a reference potential, for example, ground. Between the regions 27 and 28 a switching voltage source $S_1$ is provided which supplies a control signal $V_{S1}$, the region 28 being connected to a reference potential. By means of the control signal $V_{S1}$ transistors of the series are made conductive for transferring charge as will be explained below, the adjacent transistors of each conductive transistor of the series being not conductive. Output signals may be derived from a collector of one or more of the transistors $T_n$, for example, as shown in the Figure, from the collector of transistor $T_{12}$. The collector of this transistor $T_{12}$ is connected to an output circuit which is diagrammatically shown by the block U the construction of which is of no significance for the description of the invention. The output circuit U may comprise, for example, an impedance converter and a low-pass filter or a further delay line.

Figures 7A, 7C:
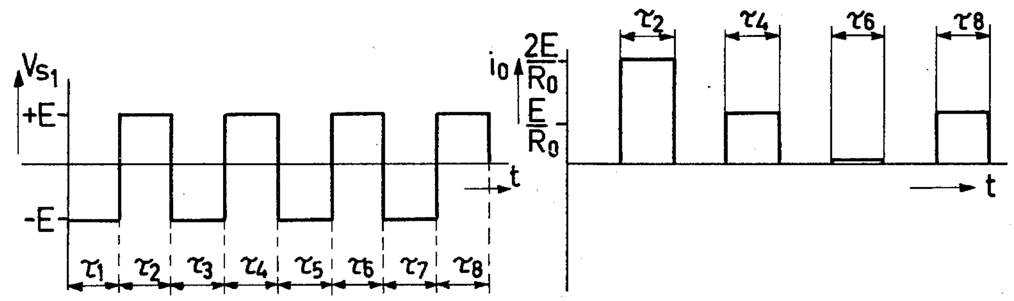
FIGS. 7a to 7e show the variation of the voltages as a function of time for a few points from the circuit diagram shown in FIG. 6, while in addition
Figures 7B, 7D:
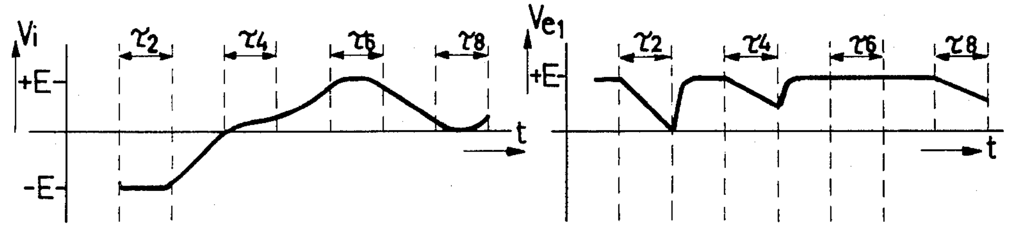

For a better understanding of the operation of the memory the most important voltage variations as a function of time of a number of points in the circuit shown in FIG. 6 are shown in FIG. 7. FIG. 7a shows the variation as a function of time of the voltage $V_{S1}$ of the switching voltage source $S_1$. It is a symmetrical square wave voltage having a maximum +E volt and a minimum −E volt, the duration of said square wave voltage being equal to T seconds. This period T, the scan period, must be at least a factor 2 smaller than the period time of the highest signal frequency occurring in the input voltage $V_i$. The input voltage $V_i$ is shown in FIG. 7*b*. During the time intervals $\tau_1$, $\tau_3$, $\tau_5$, $\tau_7$ the point 27 in FIG. 6 has a potential of −E volts relative to point 28 which is connected to earth. The transistor $T_1$ will not be conductive during the said time intervals when the input voltage $V_i$ −E volt. Assuming the capacitances $C_n$ to be charged to a voltage between 0 and +E volts, the further transistors having an odd number $T_3$, $T_5$ and so on will also be non-conductive. The transistors $T_2$, $T_4$ and so on will be conductive in the same time intervals when the voltages across the memory capacitances C1, C3 and so on are smaller than +E volt. These capacitances, C1, C3 are then charged to a voltage +E volt, while the voltages across $C_2$, $C_4$ and so on will decrease by the same amount as the voltage across the preceding capacitance with an odd number will increase. It is assumed that all the capacitances $C_n$ are of the same value.

Figure 7E:
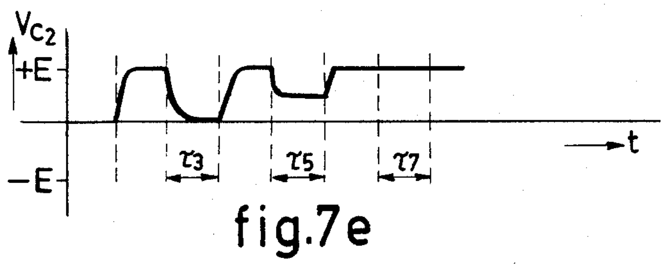

During the time in which the point 27 has a voltage of +E volt relative to point 28, information regarding the value of the input signal $V_i$ is transmitted to the capacitance $C_1$, so as shown in FIG. 7*a* during the time interval $\tau_2$, $\tau_4$, $\tau_6$, $\tau_8$. The value of the input signal during said time intervals is equal to −E, 0+E and 0 volt, respectively. During these time intervals a current will flow through the transistor $T_1$ which is equal to $E-V_i/R_o + r$ amp. which causes the voltage of E volt present across the capacitance $C_1$ to decrease. *r* is the internal base-emitter resistance. The currents which flow through the transistor T1 during the said time intervals are shown in FIG. 7*c*, while the behaviour of the voltage across the capacitance C1 is shown in FIG. 7*d* and that of the voltage across the capacitance C2 is shown in FIG. 7*e*. From FIG. 7*d* it may be seen that the voltage drops across the capacitance C1 vary linearly with time during the time intervals $\tau_2$, $\tau_4$, $\tau_6$, $\tau_8$ which is true only of the resistor $R_o$ is many times larger than the internal base-emitter resistance *r* of the transistor $T_1$. The largest voltage drop occurs in time interval $\tau_2$, namely $\delta V = E$ volt, while the voltage drop in the interval $\tau_6$ is equal to zero volt. Due to this a linear relationship between the voltage drop $\delta$ v across the capacitance C1 and the said input signal will exist only for the input signals which lie in the interval $-E<V_i<E$ volt. The resistance $R_o$ should be chosen to be large so that with an input signal of 0 volt the voltage across the capacitance $C_1$ has become exactly equal to ½E volt during the time in which point 27 has a potential of +E volt relative to earth. The mean charging current $i_{gem} = E/R_o+r$ which is required for this purpose is determined by the value of the capacitance $C_1$ and the duration $\tau$ of each scan period T in which the potential of point 27 is equal to +E volt. The said charging current is equal to $C_1E/2\,\tau$, where ½E is the voltage drop across the capacitance $C_1$ with an input signal of 0 volt. From this it follows that for a correct adjustment of the mean charging current it should hold that $\tau = 1/2C_1F$. Favourable values for the mean charging current in connection with a good signal-to-noise ratio and the required switching power lie between 1 $\mu$A and 1 $m$A.

The last transistor of the series $T_{12}$ is succeeded by a device, in the present example the diode D, which serves to bring the voltage across the capacitance $C_{12}$ to the reference level +E volt, each time before new information is transmitted to said capacitance $C_{12}$. This is achieved in that the side of the diode D remote from the collector of the transistor $T_{12}$ is connected to the bases of the transistors $T_n$ having an odd number so that the diode D comes in the conductive condition simultaneously with said transistor $T_n$ having an odd number.

From the description of the circuit arrangement shown in FIG. 6 it will be evident that the information in the form of a lack of charge of a memory capacitance $C_{n-1}$ is transmitted to the next memory capacitance $C_n$. A capacitance $c_{n-1}$ is always charged to the reference level Evolt from the next capacitance $c_n$ so that the transfer of information and the transfer of charge takes place in opposite directions.

Furthermore it will be obvious that input signals may also be supplied to the emitter of a transistor of the series other than the first as well as to the emitters of various transistors simultaneously.

The examples shown in FIGS. 3, 4 and 5 of an integrated capacitor memory comprises transistors $T_n$ having an increased collector-base capacitance. Such a transistor having an increased collector-base capacitance was described particularly with reference to FIGS. 4 and 5.

Figure 8:
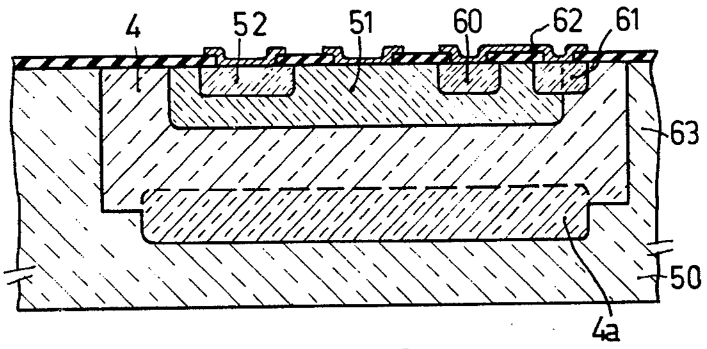
FIG. 8 is a diagrammatic cross-sectional view of a transistor, which is also suitable for use in an integrated capacitor memory according to the invention.

Another embodiment of a transistor having an increased collector-base capacitance which may also be used in a capacitor memory according to the invention will now be described with reference to FIG. 8. FIG. 8 shows a corresponding cross-sectional view of a transistor having an increased collector-base capacitance to the cross-sectional view shown in FIG. 5, corresponding components being referred to by the same reference numerals. In the transistor shown in FIG. 8, the second region consists of several parts which are denoted in the figures by 60 and 61. These parts 60 and 61 may form part of a coherent second region and/or be interconnected, for example, through windows and a metal track 62. Furthermore, a second region may be used which is entirely surrounded by the base region in the semiconductor body and which is connected to the collector region, for example, through a metal track.

Although in the example shown in FIG. 8, the surface part of the base region which is covered by the second region is smaller than in the transistor shown in FIG. 5, the edge length of the second region on the surface of the semiconductor body is larger. In a diffused base region, the concentration of the doping is highest at the surface. As a result of this the capacitance per surface unit of the pn-junction between the second region and the base region is largest at the edge in the proximity of the surface of the semiconductor body. Generally it will depend upon the doping concentrations and the thicknesses of the base region what geometry provides the largest capacitance increase. The above will enable those skilled in the art to determine for each individual case whether a maximum surface, a maximum edge length or an intermediate form located between these two extreme values, is to be preferred while taking into account the possibilities and the restrictions of the available methods of manufacturing.

Furthermore, as shown in FIG. 8, the collector region 4 may comprise a low-ohmic part 4$a$ in addition to a high ohmic part so that the collector series resistance is reduced. This low-ohmic part 4$a$ may be provided, for example, as shown in the Figure, in a conventional manner in the form of a buried layer.

Figure 9:
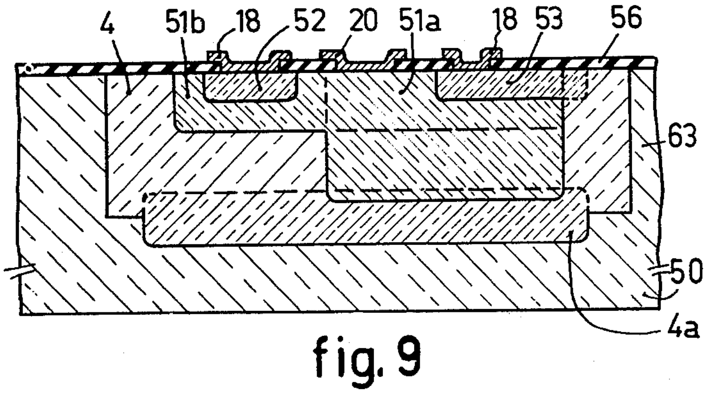
FIG. 9 is a diagrammatic cross-sectional view of another important embodiment of a transistor according to the invention.

FIG. 9 is a cross-sectional view of another important embodiment of a transistor having an increased collector-base capacitance. In this example, the base region has a thick part 51$a$ and a thin part 51$b$, the second region 53 occupying at least a surface part of the thick part 51$a$. By using a base region having a thick part and a thin part the base resistance, in particular of the more capacitive part of the base region, is reduced. However, the series resistance between the part of the collector region 4 which is located below the emitter region 52 and the second region 53 may be larger as a result of the thinner state of the collector region 4 below the thick part 51$a$ of the base region. Therefore when a base region with a thick part and a thin part is used, it is desirable that the collector region comprises in addition to a high ohmic part a low ohmic part 4$a$ which extends at least partly below the thick part 51$a$ of the base region.

In addition to a reduction of the base-series resistance the use of a base region having a thick part provides the further advantage of a contribution to the increased collector-base capacitance since the surface area of the pn-junction between the collector region 4 and the base region 51 is increased. This contribution is still somewhat increased when the thick part 51$a$ of the base region adjoins the low ohmic part of the collector region. The latter embodiment has the additional advantage that the thick part 51$a$ of the base region in manufacturing the transistor can be provided simultaneously with the insulation regions 63. Whereas the insulation region 63 extend in the substrate 50 the thick part 51$a$ of the base region will encounter the low ohmic part 4$a$ of the collector region so that no short-circuit occurs between the base region 51 and the substrate 50.

In this manner neither the use of a second region nor that of a base region having a thick and a thin part will require an extra diffusion treatment in manufacturing. The second region may be obtained simultaneously with the emitter region, the thick part of the base region may be obtained simultaneously with the separating isolation zones.

Figure 10:
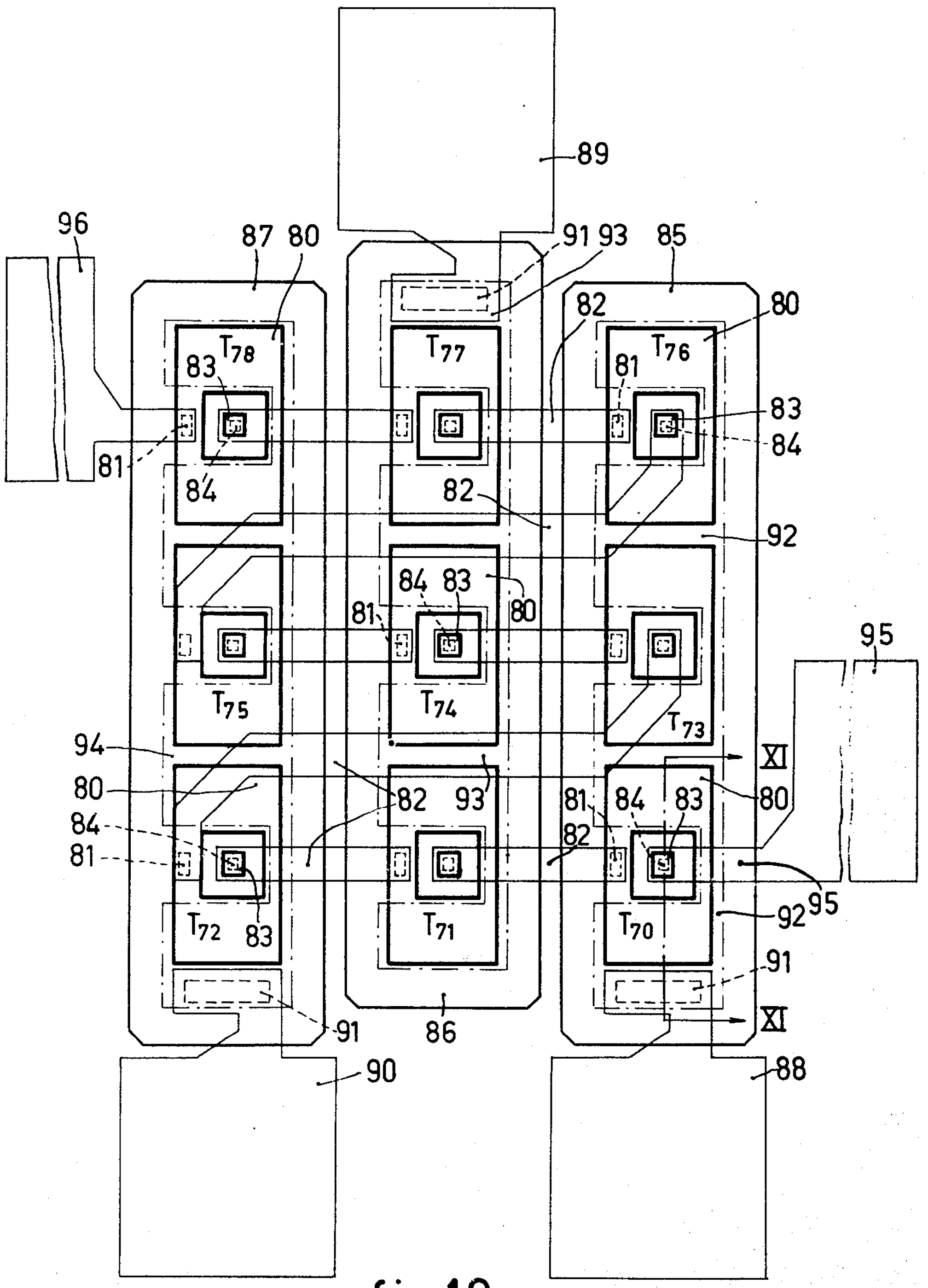
FIG. 10 is a diagrammatic plan view of a further embodiment of an integrated capacitor memory according to the invention.

In a further example of an integrated capacitor memory according to the invention, of which FIG. 10 shows a plan view, the required surface area per memory element is considerably reduced by using a different type of transistor. This example comprises a series of 9 transistors $T_{70}$ to $T_{78}$ which series comprises three successive adjacent groups of three successive transistors constituted by the transistors $T_{70}$ to $T_{72}$, $T_{73}$ to $T_{75}$ and $T_{76}$ to $T_{78}$, respectively. The collector region 80 of each of the transistors $T_{70}$ – $T_{77}$ contacts a metal track 82 on an insulating layer at the area of a window 81 in said insulating layer which track connects said collector region 80 to the emitter region 83 of the succeeding transistor of the series through a window 84. The semiconductor regions of the transistors which are associated with various groups but in their groups have the same number, the transistors $T_{70}$, $T_{73}$, $T_{76}$; $T_{71}$, $T_{74}$, $T_{77}$; and $T_{72}$, $T_{75}$ and $T_{78}$, respectively, extend in the same semiconductor islands 85, 86 and 87 respectively, said semiconductor islands constituting a common base region for the relative transistors, the emitter and collector regions being provided in the form of surface regions 83 and 80 respectively. Control signals may be applied to the common base regions 85, 86 and 87 through the metal tracks 88, 89 and 90 which contact said base regions at the area of the windows 91. The base regions may each be contacted through one window as in the present example, or through several windows which may be located, for example, on opposite sides of the semiconductor island. The emitter region 83 of the emitter 72 is connected to the metal track 95 which is associated with the electric input of the memory. Output signals can be derived through the conductive track 96 which contacts the collector region 80 of the transistor $T_{78}$ at the area of the window 81.

A part of the surface of the collector regions 80 is occupied by further surface regions 92, 93 and 94, respectively which further surface regions are of the same conductivity type as the base regions 85 to 87. Each of the further surface regions 92, 93 and 94 also occupies part of the surface of the relative base regions 85, 86 or 87, so that the further surface regions are connected to the relative base region.

Figure 11:
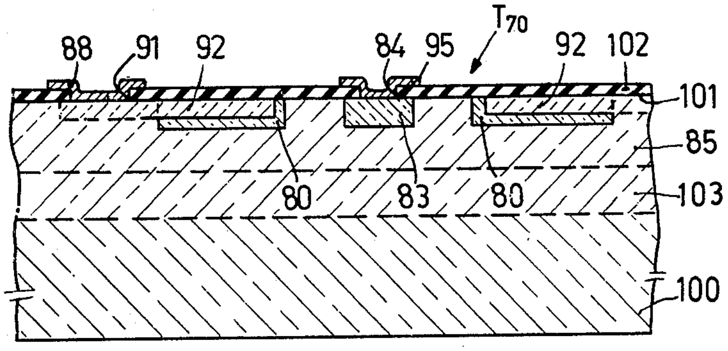
FIG. 11 is a diagrammatic cross-sectional view of one of the transistors used in the memory shown in FIG. 10 taken on the line XI—XI of FIG. 10.

For further explanation FIG. 11 shows a cross-sectional view of the transistor $T_{70}$, taken on the broken line XI—XI of FIG. 10, in which corresponding components are referred to by the same reference numerals. The transistor $T_{70}$ comprises a semiconductor body which is constituted by a substrate 100, for example, of *p*-type silicon and an epitaxial *n*-type silicon layer provided thereon an emitter region 83 and a collector region 80, both of *p*-type silicon, extending from the same surface 101 in the semiconductor body in which they are surrounded within the semiconductor body by a base region 85. According to the invention a part of the surface of the collector region 80 is occupied by a further surface region 92 which is of the same conductivity type as and is connected to the base region 85.

The surface 101 of the semiconductor body is covered with an insulating layer 102 in which windows 81, 84 and 91 are provided in which metal, tracks 82, 95 and 88 contact the collector region 80, the emitter region 83 and the base region 85, respectively. Furthermore, to reduce the series resistance in the base region 85, a low-ohmic part 103 shown in FIG. 11 as a layer with broken lines, may be present, which part 103 is of the same conductivity type as and has a lower resistivity than the base region 85.

The integrated memory described with reference to FIGS. 10 and 11 shows a particularly compact structure with a simple pattern of conductive tracks. Furthermore, the conductive tracks 82 which connect the emitter region 83 of one transistor to the collector region 80 of the subsequent transistor extend only over a very short distance directly above the collector region 20 of the said one transistor, so that the stray emitter-collector capacitance, through which electric cross-talk may take place are very small.

Furthermore the stray substrate capacitance in the present example occurs between the bases of the transistors and the substrate which, from a point of view of switching technology, is more favourable than between the collectors and the substrate, as is shown in the memory shown in FIGS. 3, 4 and 5. Moreover, in the memory shown in FIGS. 3, 4 and 5 the emitter-base breakdown voltage is decisive of the maximum permissible voltage across the memory capacitances, said breakdown voltage being only a few volts with double-diffused transistors having a good emitter efficiency. On the contrary, in the transistor shown in FIG. 11, the base-collector breakdown voltage as the lowest breakdown voltage, is decisive, and this breakdown voltage may easisly be higher than that in the case of a double-diffused transistor.

Just as the integrated memory shown in FIGS. 3, 4 and 5, the integrated memory shown in FIGS. 10 and 11 may be manufactured entirely in a manner commonly used in semiconductor technology.

It is to be noted that the invention is not restricted to the examples described and that many variations are possible to those skilled in the art without departing from the scope of this invention. For example, the structure of the memory shown in FIG. 3, may be slightly reduced in size by arranging the conductive tracks 19 and 20 partly above the collector regions of those transistors of which the base region is connected to the relative conductive track instead of providing them completely above the insulation regions 63. In that case the insulation regions 63 may be constructed to be narrower without extra stray capacitances, through which electric cross-talk may take place, being introduced between the conductive tracks 19 and 20 and collector regions of transistors which are not connected to the relative conductive track. Furthermore, shorter or longer series of transistors may be used in which, if required, the losses which are mainly caused in that the gain factor of the transistors is smaller than 1, may be compensated by the interconnection of one or more charge amplifiers. Alternatively, several series of transistors may be arranged in parallel in which a common input and/or a common output may be used. Furthermore conventional sampling circuits and/or output circuits may be used which, like the charge amplifiers, if any, may be integrated completely or partly together with the capacitor memory. This and other possibilities of the circuit were already described in the above-mentioned U.S. Pat. No. 3,546,490.

Furthermore, in addition to electric signals the input signals may also have a different nature, for example, an electromagnetic nature. For example, the photosensitivity of the collector-base junction may be used, it being of importance that the photosensitivity of said pn-junction in a transistor having an increased collector-base capacitance is increased by the presence of the second region and the further surface region, respectively. This greater photosensitivity is associated not only with the larger surface area of the pn-junction, but also with the fact that a part of said pn-junction, namely that between the second region and the base region and between the further surface region and the collector region, respectively, is located at a smaller distance from the semiconductor surface than would be the case in the absence of such a second region and a further surface region, respectively.

The transistors may be both npn-transistors and pnp-transistors, while in addition other conventional geometries, insulation methods and materials may be used. In addition, transistors having an increased collector-base capacitance may be assembled in a conventional envelope and be used as components, for example, in capacitor memories, or as Miller integrators. In that case the insulation regions may be omitted and, for example, a low ohmic semiconductor substrate of the same conductivity type as that of the collector region may be used.

What is claimed is:

1. An integrated memory, comprising a plurality of transistors each having a base, an emitter and a collector, the collector-base junction of a multiplicity of said transistors forming the major capacitor storage medium for storing signal current charge in a reversed bias condition of the base-collector junction, means for series connecting the emitter-collector paths of the transistors by connecting the emitter of each but a first transistor to the collector of a preceeding transistor in the series, a substrate provided with insulated semiconductor islands for supporting the transistors in the series, and means for conducting switching pulses into the base of each transistor in the series, whereby charge is transferred between the capacitor storage medium of succeeding charge storage transistors in the series.

2. A capacitor memory as claimed in claim 1, wherein the bases of alternate groups of transistors of the series are interconnected.

3. A memory as claimed in claim 2, each transistor comprising a semiconductor body in which an emitter region and a collector region extend from the same surface in the semiconductor body, in which inside the semiconductor body they are surrounded by a base region, and wherein a part of the surface of the collector region is occupied by a further surface region which is of the same conductivity type as and is connected to the base region.

4. A capacitor memory as claimed in claim 1, wherein the series of transistors comprises at least two succeeding adjacent groups having the same number of succeeding transistors, the bases of said transistors which are associated with various groups, but in their group have the same number, being interconnected.

5. A capacitor memory as claimed in claim 1, wherein the base region of at least one of the transistors of the series is a surface region, a first surface part of which is occupied by the emitter region and a second surface part of which is occupied by a second region, the second region which is of the same conductivity type as the emitter region being connected to the collector region adjoining said base region.

6. A capacitor memory as claimed in claim 5, wherein the said base region is provided with a connection conductor which contacts the base region at a place located between the emitter region and the second region.

7. A capacitor memory as claimed in claim 5, wherein the second region occupies at least 1/3 part of the surface of the base region.

8. A capacitor memory as claimed in claim 5, wherein the said base region comprises a thick part and a thin part, the second region occupying at least a surface part of the thick part.

9. A capacitor memory as claimed in claim 8, wherein the collector region comprises a low-ohmic part in addition to a high-ohmic part, which low-ohmic part extends at least partly below the thick part of the base region.

10. A capacitor memory as claimed in claim 9, wherein the low-ohmic part of the collector region adjoins the thick part of the base region.

11. A capacitor memory as claimed in claim 1, wherein the semiconductor regions of a number of transistors of the series, the bases of which are interconnected, extend in a common semiconductor island, the semiconductor island constituting a common base region for the transistors, the emitter region and collector region being provided in the form of surface regions.

12. A capacitor memory as claimed in claim 11, wherein a part of the surface of the collector region of at least one of the transistors of the series is occupied by a further surface region which is of the same conductivity type as and is connected to the base region.

13. A circuit arrangement comprising an integrated capacitor memory as claimed in claim 1, wherein input signals may be applied to the emitter of one or more transistors of the series, an output circuit being provided for deriving electric signals from the collector of at least one transistor of the series, control signals being applied to the bases of the transistors of the series by means of at least one switching voltage source, said control signals bringing transistors of the series in the conductive condition for transferring charge, the adjacent transistors of each conductive transistor of the series being non-conductive.

14. A transistor for use in a capacitor memory as claimed in claim 1, comprising a semiconductor body in which the base region of the transistor is a surface region of the semiconductor body, a surface part of said base region being occupied by the emitter region, the collector being provided only with one or more connection conductors which contact only said collector, characterized in that a second surface part of the base region is occupied by a second region, the second region which is of the same conductivity type as the emitter region being connected to the collector region adjoining the base region.

15. A transistor as claimed in claim 14, wherein the base region is provided with a connection conductor which contacts the base region at a place located between the emitter region and the second region.

16. A transistor as claimed in claim 14, wherein the second region occupies at least ⅓ part of the surface of the base region.

17. A transistor as claimed in claim 14, wherein the said base region comprises a thin part and a thick part, the second region occupying at least a surface part of the thick part.

18. A transistor as claimed in claim 17, wherein the collector region comprises a low-ohmic part in addition to a high-ohmic part, which low-ohmic part extends at least partly below the thick part of the base region.

19. A transistor as claimed in claim 18 wherein the low-ohmic part of the collector region adjoins the thick part of the base region.

* * * * *

UNITED STATES PATENT AND TRADEMARK OFFICE
CERTIFICATE OF CORRECTION

PATENT NO. : 3,912,944

DATED : October 14, 1975
INVENTOR(S) : CORNELIS MULDER and FREDERIK LEONARD JOHAN SANGSTER It is certified that error appears in the above-identified patent and that said Letters Patent are hereby corrected as shown below:

ON THE TITLE PAGE

Section [63] should read as follows:

--[63] Continuation of Serial No. 380,764, filed July 19, 1973, which was a continuation of Serial No. 215,930, filed January 6, 1972, which was a continuation of Serial No. 816,913, filed April 17, 1969, now all abandoned.--;

IN THE SPECIFICATION

Col. 1, lines 4 and 5 should read --This is a continuation of Serial No. 380,764, filed July 19, 1973, which was a continuation of Serial No. 215,930, filed January 6, 1972, which was a continuation of Serial No. 816,913, filed April 17, 1969, now all abandoned.--;

Col. 3, line 39, "Transistor" should be --transistor--;

Col. 10, line 64, "$\delta$ V" should be --$\Delta$V--;

line 66, "$\delta$ v" should be --$\Delta$V--;

UNITED STATES PATENT AND TRADEMARK OFFICE

CERTIFICATE OF CORRECTION

PATENT NO. : 3,912,944

DATED : October 14, 1975

INVENTOR(S) : CORNELIS MULDER and FREDERIK LEONARD JOHAN SANGSTER

It is certified that error appears in the above-identified patent and that said Letters Patent are hereby corrected as shown below:

Col. 11, line 1, "$-E < V_i < E$" should be -- $-E \leq V_i \leq E$--;

line 14, "$C_1F$" should be --$C_1R$--;

line 33, "$c_{n-1}$" should be --$C_{n-1}$--;

line 34, "$c_n$" should be --$C_n$--;

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*